(12) United States Patent
Barnes et al.

(10) Patent No.: US 8,943,110 B2
(45) Date of Patent: Jan. 27, 2015

(54) METHOD AND SYSTEM FOR MANAGING DATA STORAGE AND ACCESS ON A CLIENT DEVICE

(71) Applicant: Research In Motion Limited, Waterloo, CA (US)

(72) Inventors: Jordan Douglas Barnes, Stittsville, CA (US); Andrey Feldman, Hamilton, CA (US)

(73) Assignee: BlackBerry Limited, Waterloo (CA)

( * ) Notice: Subject to any disclaimer, the term of this patent is extended or adjusted under 35 U.S.C. 154(b) by 61 days.

(21) Appl. No.: 13/705,774

(22) Filed: Dec. 5, 2012

(65) Prior Publication Data
US 2014/0122424 A1    May 1, 2014

Related U.S. Application Data

(63) Continuation-in-part of application No. 13/660,341, filed on Oct. 25, 2012.

(51) Int. Cl.
*G06F 12/00*    (2006.01)
*G06F 17/30*    (2006.01)

(52) U.S. Cl.
CPC .............. *G06F 17/30091* (2013.01)
USPC ...................................... 707/822

(58) Field of Classification Search
CPC ... G06F 3/0643; G06F 17/30; G06F 17/3007; G06F 17/30091; G06F 17/30115
See application file for complete search history.

(56) References Cited

U.S. PATENT DOCUMENTS

| | | | |
|---|---|---|---|
| 1,331,018 A * | 2/1920 | Luthy | 429/143 |
| 5,727,202 A | 3/1998 | Kucala | |
| 5,884,323 A | 3/1999 | Hawkins et al. | |
| 6,195,707 B1 | 2/2001 | Minh | |
| 6,826,724 B1 * | 11/2004 | Shimada et al. | 715/234 |
| 7,007,041 B2 | 2/2006 | Multer et al. | |
| 7,490,112 B1 | 2/2009 | Suresh et al. | |
| 8,140,301 B2 * | 3/2012 | Abe et al. | 703/2 |
| 8,296,763 B1 * | 10/2012 | Peercy et al. | 718/1 |
| 8,375,446 B2 * | 2/2013 | Eiland et al. | 726/23 |

(Continued)

FOREIGN PATENT DOCUMENTS

| | | |
|---|---|---|
| WO | 2007019258 A2 | 2/2007 |
| WO | 2009023585 A2 | 2/2009 |

OTHER PUBLICATIONS

"Vnodes: An Architecture for Multiple File System Types in Sun UNIX," S.R. Kieinman, Sun Microsystems, 1986.

(Continued)

*Primary Examiner* — Robert Beausoliel, Jr.
*Assistant Examiner* — Nicholas Allen

(57) ABSTRACT

A method, apparatus and computer program product for managing data storage and access on a computing device. The computing device is associated with a storage system accessible via a first communication interface and a second communication interface. A unified file system interface facilitates interaction with the computing device and is operable to facilitate interaction with content of the storage system via either of the communication interfaces, as available. The unified file system interface is configured as a file system capable providing access to content of the storage system via alias file paths which are independent of whether the unified file system interface is operating in the first mode or the second mode.

18 Claims, 10 Drawing Sheets

(56) References Cited

U.S. PATENT DOCUMENTS

| | | | | |
|---|---|---|---|---|
| 2002/0152339 | A1 | 10/2002 | Yamamoto | |
| 2003/0101277 | A1 | 5/2003 | Crump | |
| 2004/0024720 | A1* | 2/2004 | Fairweather | 706/46 |
| 2004/0117804 | A1* | 6/2004 | Scahill et al. | 719/320 |
| 2004/0186842 | A1 | 9/2004 | Wesemann | |
| 2006/0123064 | A1 | 6/2006 | Kim et al. | |
| 2007/0112824 | A1* | 5/2007 | Lock et al. | 707/102 |
| 2007/0112891 | A1 | 5/2007 | Marriott | |
| 2008/0059656 | A1* | 3/2008 | Saliba et al. | 709/248 |
| 2008/0114806 | A1* | 5/2008 | Kosche | 707/104.1 |
| 2008/0126434 | A1 | 5/2008 | Uysal | |
| 2008/0163202 | A1* | 7/2008 | Kembel et al. | 717/178 |
| 2008/0208919 | A1 | 8/2008 | Dalfo | |
| 2008/0270077 | A1* | 10/2008 | Ozonat et al. | 702/186 |
| 2009/0070404 | A1 | 3/2009 | Mazzaferri | |
| 2009/0204386 | A1 | 8/2009 | Seligman et al. | |
| 2009/0207817 | A1* | 8/2009 | Montemurro et al. | 370/338 |
| 2009/0228122 | A1* | 9/2009 | Baier et al. | 700/83 |
| 2009/0276771 | A1* | 11/2009 | Nickolov et al. | 717/177 |
| 2009/0287671 | A1 | 11/2009 | Bennett et al. | |
| 2009/0327318 | A1 | 12/2009 | Peacock | |
| 2010/0049749 | A1 | 2/2010 | Chiu | |
| 2010/0100774 | A1* | 4/2010 | Ding et al. | 714/45 |
| 2010/0106684 | A1 | 4/2010 | Pizzo et al. | |
| 2010/0107255 | A1* | 4/2010 | Eiland et al. | 726/23 |
| 2010/0257218 | A1 | 10/2010 | Vassilev et al. | |
| 2011/0029469 | A1* | 2/2011 | Yamada | 706/14 |
| 2011/0092153 | A1* | 4/2011 | Patron et al. | 455/3.01 |
| 2011/0131499 | A1* | 6/2011 | Ferris et al. | 715/736 |
| 2011/0137859 | A1 | 6/2011 | Dickman | |
| 2011/0185067 | A1* | 7/2011 | Finn | 709/226 |
| 2011/0185355 | A1* | 7/2011 | Chawla et al. | 718/1 |
| 2011/0219066 | A1* | 9/2011 | Saint Clair et al. | 709/203 |
| 2011/0271146 | A1* | 11/2011 | Mork et al. | 714/37 |
| 2011/0302194 | A1* | 12/2011 | Gonzalez et al. | 707/769 |
| 2012/0017012 | A1* | 1/2012 | Bartholomay et al. | 710/51 |
| 2012/0054346 | A1* | 3/2012 | Lee et al. | 709/226 |
| 2012/0072463 | A1* | 3/2012 | Moganti et al. | 707/803 |
| 2012/0105489 | A1* | 5/2012 | Monroe et al. | 345/684 |
| 2012/0109882 | A1* | 5/2012 | Bouse et al. | 707/607 |
| 2012/0151105 | A1* | 6/2012 | Noborikawa et al. | 710/38 |
| 2012/0198367 | A1* | 8/2012 | Bornheimer et al. | 715/763 |
| 2012/0254333 | A1* | 10/2012 | Chandramouli et al. | 709/206 |
| 2012/0297179 | A1* | 11/2012 | Lirbank et al. | 713/2 |
| 2012/0310879 | A1 | 12/2012 | Kaila et al. | |
| 2012/0311174 | A1* | 12/2012 | Bichot et al. | 709/231 |
| 2012/0317090 | A1 | 12/2012 | Bennett | |
| 2013/0024270 | A1* | 1/2013 | Linzie et al. | 705/14.41 |
| 2013/0067530 | A1* | 3/2013 | Spektor et al. | 726/1 |
| 2013/0073490 | A1* | 3/2013 | Baughman et al. | 706/13 |
| 2013/0097685 | A1* | 4/2013 | Kennedy et al. | 726/8 |
| 2013/0104114 | A1* | 4/2013 | Reiss et al. | 717/170 |
| 2013/0117512 | A1 | 5/2013 | Ishikawa et al. | |
| 2013/0138428 | A1* | 5/2013 | Chandramouli et al. | 704/9 |
| 2013/0159248 | A1* | 6/2013 | Mueller | 707/609 |
| 2013/0227057 | A1* | 8/2013 | Goldstein et al. | 709/217 |
| 2013/0245793 | A1* | 9/2013 | Akiyama et al. | 700/79 |
| 2013/0254213 | A1* | 9/2013 | Cheng et al. | 707/748 |
| 2014/0006345 | A1* | 1/2014 | Laitkorpi et al. | 707/610 |
| 2014/0040363 | A1* | 2/2014 | Reddy et al. | 709/204 |
| 2014/0068259 | A1* | 3/2014 | Resch et al. | 713/167 |

OTHER PUBLICATIONS

Office Action dated Sep. 25, 2014 for corresponding U.S. Appl. No. 13/660,341.

* cited by examiner

100

110
Provide Unified File System Interface (UFSI)

115
Provide Access to Data Stored on Storage Systems via UFSI Common Data Structure

120
Provide Information Relating Alias Files with Actual Files (e.g. via lookup table or metadata)

130
Perform Data Management on Actual Files

140
Maintain Associations between Alias Files and Actual Files

FIG. 1

| 1110            | 1120                            | 1130                             |
|-----------------|---------------------------------|----------------------------------|
| Alias File Path | Actual File Path (First Interface) | Actual File Path (Second Interface) |
| ~~~~~~~~~~~~~   | ~~~~~~~~~~~~~                   | ~~~~~~~~~~~~~                    |
| ~~~~~~~~~~~~~   | ~~~~~~~~~~~~~                   | ~~~~~~~~~~~~~                    |
| ~~~~~~~~~~~~~   | ~~~~~~~~~~~~~                   | ~~~~~~~~~~~~~                    |
| ~~~~~~~~~~~~~   | ~~~~~~~~~~~~~                   | ~~~~~~~~~~~~~                    |

FIG. 11

METHOD AND SYSTEM FOR MANAGING DATA STORAGE AND ACCESS ON A CLIENT DEVICE

CROSS-REFERENCE TO RELATED APPLICATIONS

This application is a continuation-in-part of U.S. application Ser. No. 13/660,341, filed Oct. 25, 2012. The forgoing application is incorporated by reference herein in its entirety.

TECHNICAL FIELD

The present technology relates generally to data management, and, in particular, to managing data storage and access on storage systems of a client device, such as a mobile device.

BACKGROUND

Synchronization of data, such as media files, address book or calendar entries, and the like, is commonly performed between different computing devices, such as mobile devices, smart phones, tablet computers, media players, desktop and laptop computers, and the like.

In some cases, it may be required to synchronize large numbers of files such as media files, large files, or both, between different devices, such as between a desktop computing device and a mobile computing device. However, complications may arise due to storage limitations, for example when there is limited persistent storage on the mobile computing device. For example, some devices include plural file systems, storage media, or both, such as removable and non-removable media. In this case, data synchronization is complicated by the existence of the plural file systems.

Therefore there is a need for a method and system for data synchronization and management that is not subject to one or more limitations of the prior art.

BRIEF DESCRIPTION OF THE DRAWINGS

Further features and advantages of the present technology will become apparent from the following detailed description, taken in combination with the appended drawings, in which:

FIG. 1 illustrates a method for managing data storage and access on a computing device, in accordance with embodiments of the present technology.

FIG. 11 illustrates correspondences between alias file paths and actual file paths, in accordance with embodiments of the present technology.

It will be noted that throughout the appended drawings, like features are identified by like reference numerals.

DETAILED DESCRIPTION

Figure 2:
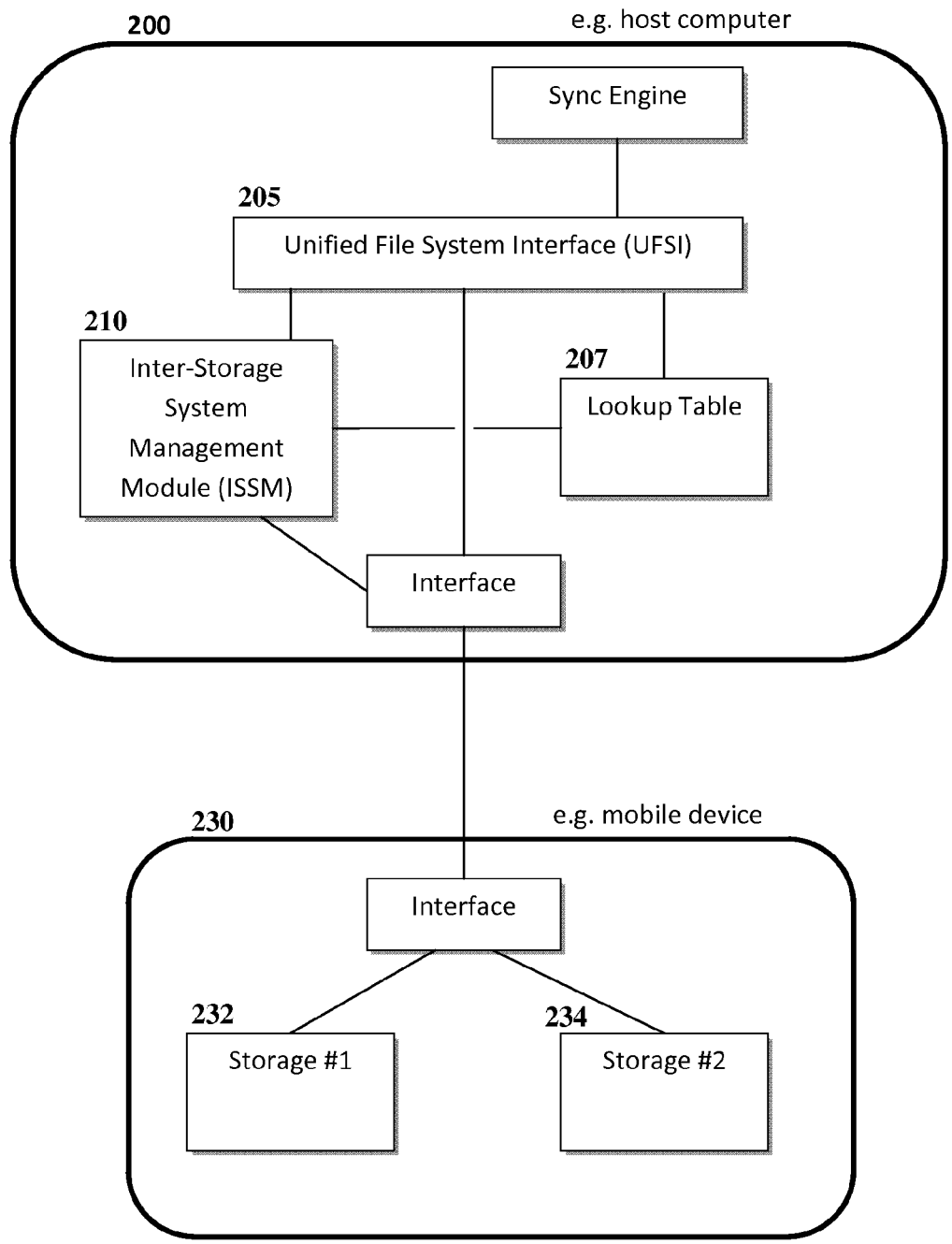
FIG. 2 illustrates an apparatus for managing data storage and access on a computing device, in accordance with embodiments of the present technology.

The present technology generally provides a method, apparatus and computer program product related to managing data storage and access on plural file systems, storage media, or both, of at least one computing device, such as a client mobile device. As used herein, file systems, storage media, or combinations of both, are collectively referred to as "storage systems." Computing devices may be mobile devices (for example smart phones, tablet computers, media players, and the like), network drives, computers or their hard drives, solid-state memory devices, or the like.

Various embodiments of the present technology relate to the operation of a computing device, such as a mobile device. The computing device is associated with two or more storage systems. For example, the computing device may include a non-removable, non-volatile memory such as internal flash memory, as well as a socket for holding a removable non-volatile memory such as an SD™ Card. The computing device may be subject to full or partial data synchronization operations, for example to synchronize data stored thereon with selected data stored on at least one other computing device, such as a desktop or laptop computer.

In some embodiments, a storage system may correspond to a virtual file system, a remote storage system, a cloud-based storage system, a logical storage system or the like. In some embodiments, some storage systems may reside on one mobile computing device, while others may reside on another mobile computing device.

For various reasons, such as performance optimization, it may be desirable to manage the allocation of different data files to different ones of the various storage systems of the computing device. For example, it may be desirable to group, as much as possible, all media files of a certain type within the same storage system. As another example, it may be desirable to store certain media files such as video files on a storage medium having sufficient access speed to support reliable playback. As yet another example, it may be desirable to move large files off of a first file system and onto another, to make room for other files (such as internal executable or configuration files) which may be required to be on the first file system, for example for security or operational reasons.

Embodiments of the present technology facilitate such data management by determining which of the computing device's storage systems should be used for storing various data files. Such a determination may be performed for new data files introduced for storage on the computing device via a synchronization operation. Such a determination may additionally be performed for existing data files already stored on the computing device, for example in order to re-evaluate its storage location and potentially move the data file. Such a determination may be made for a combination of data files, for example in order to swap locations of existing data files, or to move an existing data file to a different location in order to make room for a new data file. Data management operations may be ongoing and dynamic.

However, it is further recognized that, as such data management operations involve moving files from one location to another, data management may interfere with existing data synchronization schemes. For example, a data management operation may cause a file stored on one storage system of the computing device to be moved to another storage system of the computing device. During the next data synchronization event, a data synchronization engine would not necessarily be informed of the file move, which may cause an exception or undesired operation to occur during the synchronization (such as a file deletion, data corruption, file duplication, error, or the like).

Embodiments of the present technology aid in solving the above-identified problem by providing a unified file system interface which is usable for accessing and interacting with the various data stored on the two or more storage systems, storage media, or both, of the computing device. Notably, the apparent location of a file in the unified file system is unaffected if the actual location of that file is moved due to a data management operation.

The unified file system may comprise a unified file system interface which acts as a directory structure. In some embodiments, the unified file system interface may comprise a lookup table which associates alias file paths with actual file paths, the lookup table being maintained dynamically. In some embodiments, the unified file system interface may be generated dynamically, for example on the basis of metadata and in response to external commands or queries.

In some embodiments, for each data file stored on the computing device, the unified file system interface is configured to define an alias file path which is usable to access the data file, for example by synchronization engines or other external utilities. The unified file system interface is further configured to track the details of where the actual corresponding data file is stored, for example including the storage system, file system path, and the like. If the data file is moved due to data management operations, these storage details are updated. The unified file system interface is further configured to maintain a set of associations between alias file paths and actual file paths (the actual file paths including a designation of the actual storage system upon which the data file is stored), and to translate between alias file paths and actual file paths as required in order to support data synchronization and other external operations. The set of associations may be maintained in the form of a data structure stored in memory, such as a list, a table, or the like.

In some embodiments, the path to a particular storage system may be adjusted dynamically and possibly during a synchronization or other communication operation. For example, a mobile device may initially be connected to a host via a first interface such as an RNDIS interface which operates over USB™, for example, and is associated with a first IP address. The connection may then be switched, for example by the host or mobile device, to a VPN tunnel interface which operates over USB™ or Wi-Fi™, or a combination thereof, for example, and is associated with a second IP address. The physical interface and path may or may not be changed by this switch, but logical characteristics of the interface and path, such as the IP address, are changed. As another example, a mobile device may initially be connected to a host via a first interface such as a USB™ interface. The mobile device may then be disconnected from the first interface. Such a disconnection may initiate connection to another interface, or failover use of another existing interface, such as a Wi-Fi™ interface. The host may thus be connected to the same storage system of the mobile device via different paths.

In some embodiments, each path to a storage system, and thus each associated communication interface, may associated with a separate IP address, and each path may be associated with a separate set of communication protocols. For example, one path may be associated with an RNDIS interface while another may be associated with a VPN tunnel. The RNDIS interface may facilitate communication over a USB™ interface, for example. The VPN tunnel may operate over both the USB™ interface and a Wi-Fi™ interface, wherein switching between these two physical interfaces does not require a corresponding change in IP address.

Embodiments of the present technology may be configured to facilitate communication with the same storage system via different physical paths, logical paths, or combinations thereof. Furthermore, the unified file system interface may be configured to provide a common set of file path aliases which may be used to access corresponding content of the storage system, regardless of which of the different paths is being used.

Additionally, in some embodiments, if different storage systems of the computing device respond to different syntaxes, the unified file system interface may perform syntax translation. Thus, a common syntax may be used to interact with the different storage systems.

Thus, various embodiments of the present technology involve the interaction between the above-described data management and unified file system interface functionalities. Furthermore, it is recognized that various synergistic advantages may arise from the interaction between these two features. For example, the presence of a unified file system interface may allow for data management operations to be performed without adversely impacting separate data synchronization schemes. As another example, to be described in more detail below, various functionalities of the unified file system interface may be re-used in performing data management operations and vice-versa, thereby reducing the number of separate elements of the combined system.

Various embodiments of the present technology address the problem of how to enable synchronization of a potentially large amount of data to a mobile device having limited persistent storage. In one embodiment, a desktop management utility may be configured, in response to synchronization operations, to synchronize a large amount of data to the mobile device and, if a first storage medium (such as an SD™ card) is full, then some of the data may be synchronized to an internal storage medium of the mobile device, such as flash memory. The utility may be configured to resolve the boundary across the various storage media, including tracking of files such as music playlists, picture albums, video albums, and document folders that traverse the different storage media. On the desktop, storage system interfaces for the plurality of storage media are combined into a single unified file system abstraction. Client applications may then construct paths from the unified file system, and may further be abstracted from the details of which underlying storage system is being used to store and retrieve files and storage system information.

Continuing with the above embodiment, a data manager, associated with the unified file system, may be provided which monitors the available space across all the storage media associated with the computing device. When new files are provided for synchronization from a desktop to the computing device, for example a mobile device, the data manager directs where the files are to be stored. For example, a primary drive may be targeted first where space is available, otherwise files may be written to a corresponding location on a secondary drive. For example, a device file path, constructed in correspondence with the unified file system interface:

\\DTS[PIN]\unified\album\artist\track.mp3 may be written to an actual file path corresponding to a removable SD™ card:

\\IP-address\removable_SDCARD\music\album\artist\track.mp3 where space is available, but, if space is not available on the SD card, then the above device file path may instead be written to a different actual file path:

\\IP-address\internal\music\album\artist\track.mp3 on the secondary drive, corresponding to device internal memory. When a collection such as a playlist, picture album, video album, or document folder is synced from the device to the desktop, file items may be combined from corresponding locations across the drives. For example, a query for files in the folder:

\\DTS[DEVICE_PIN]\unified\music\album\artist may return files from both:

\\IP-address\removable_SDCARD\music\album\artist and

\\IPaddress\internal\music\album\artist.

Because the unified file system is abstracted from synchronization logic, data management operations may occur without disrupting the synchronization logic. In particular, drive space can be adjusted by moving files between drives in accordance with data management operations. For example, a large video file may be relocated from an SD™ Card to an internal drive in order to co-locate pictures from a picture album on the same drive.

Accordingly, and with reference to FIG. 1, an aspect of the present technology provides a method 100 for managing data storage and access on a computing device. The computing device includes two or more storage systems, for example two or more storage media each of which is associated with its own file system. The method comprises providing 110 a unified file system interface. The method further comprises providing 115 access to the data stored on the two or more storage systems via a common structure of the unified file system interface. This common structure typically appears as a tree-like directory structure commonly associated with storage systems. The common structure is then provided for use by external applications such as synchronization utilities to navigate the unified file system interface, and includes an alias file for each data file stored on the two or more storage systems. The alias file, in combination with its location within the common structure, is referred to as an alias file path. Furthermore, the common structure is made to be independent of the actual location of the data within the two or more storage systems. The method further comprises providing 120, for alias file, information specifying the actual location of the data associated with the alias file. For example, this information may be maintained in a lookup table or in a data item such as a pointer located within the unified file system interface. As another example, this information may be generated as required, for example based on metadata stored within the device, each item of metadata including a reference to the actual location of an associated data file.

The method further comprises performing 130 data management operations on the two or more storage systems. Data management operations comprise determining, in accordance with a rule set, where data is to be stored within the two or more storage systems, and storing or moving the data accordingly. The rule set may be predetermined in the sense that it has a given form upon commencement of data management operations. The rule set may be a fixed rule set or a rule set which is variable. A variable rule set may be changed for example to facilitate load balancing. The method may further comprise maintaining 140 the associations between the alias files and the actual locations of the associated data, in response to said data management operations. Additionally or alternatively, the method may further comprise maintaining associations between metadata and the actual locations of the data files associated with the metadata, in response to said data management operations. For example, if a data file is moved, its associated metadata may be updated to point to the new file location, moved along with the data file, or both.

Another aspect of the present technology provides a computer program product for facilitating management of data storage and access on a computing device, such as a mobile device operatively coupled to a host computer. The computer program product comprises code which, when loaded into memory and executed on a processor of a host computer, is adapted to perform operations associated with methods and apparatus as described herein. The code of the computer program product may be executed on a host computer system, to which the computing device is removably communicatively coupled.

With reference to FIG. 2, another aspect of the present technology provides an apparatus 200 for facilitating data storage and access on a computing device 230. The computing device 230 comprises at least a first storage system 232 and a second storage system 234. The apparatus 200 comprises a unified file system interface 205 configured to facilitate interaction with the computing device. The unified file system interface is configured to function, from the perspective of an external client utility, as a file system capable of facilitating interaction with content of both the first storage system and the second storage system. The apparatus 200 further comprises an inter-storage system management module 210 configured to manage storage of content across the first storage system and the second storage system in accordance with a rule set. File locations within the unified file system interface are independent of locations of corresponding content of the first storage system and the second storage system. The unified file system interface 205 may optionally comprise a lookup table 207, which is configured to associate alias file names, alias file paths, or both, with actual file names, actual file paths, or both. The alias file names and alias file paths correspond to the file locations within the unified file system interface and may remain unchanged even as the actual file names, actual file paths, or both, are updated. As the inter-storage system management module allocates or updates actual file names, actual file paths, or both, the lookup table is also updated.

The term "file system" is used to describe an aspect of a computing device which stores data in a predefined format. A file system may be associated with one or more data storage media such as hard drives, magnetic, optical or solid state memory, or the like, or a combination thereof. Such data storage media are typically, but not necessarily, rewritable and non-volatile media. Examples of file systems include FAT, NTFS, UFC, DFTP, and the like.

The term "syntax" is used to describe a structured language for interacting with an aspect of a computing device, such as a file system. A syntax typically comprises both input syntax and output syntax. Input syntax comprises a syntax for expressions to which the device employing the syntax is responsive. Output syntax comprises a syntax for expressions which are generated by the device, for example in response to input composed using the input syntax. Interaction with different devices or aspects thereof may follow different syntaxes. That is, a particular device aspect may be responsive to input expressed in a particular input syntax, and may generate output expressed a particular output syntax. Different aspects of computing devices, such as file systems, may have different but typically at least partially analogous capabilities. As such, different syntaxes may relate to different but at least partially analogous expressions such as messages, commands, queries, and the like. For completeness, the term "syntax" may also encompass "grammar," where appropriate.

In some cases the term "syntax" may be extended to encompass conditional or unconditional sequences of expressions, interaction rule sets, and the like. An interaction rule set may comprise, for example, a first sequence of one or more commands, an instruction to wait for and process a response to the first sequence, and an instruction to select a second sequence of one or more commands from a predetermined list, based on the processed response.

The term "expression" is used to describe expressible aspects of a syntax. Examples of expressions include messages, commands, queries, path expressions, and the like. Expressions may be compounded with other expressions, variables, or the like, in accordance with predetermined rules of the syntax.

The term "translation" is used to describe translation of expressions between two syntaxes. For bidirectional communication, translation may accordingly be a bidirectional process. For example, a query expressed in a first syntax, such as a generic syntax, may be translated into an analogous query expressed in a second syntax, such as a device-specific syntax, and a response to the query, expressed in the second syntax, may be subsequently translated into the first syntax.

The term "data synchronization" pertains to operations which ensure data content, such as media files, database entries, address book contacts, calendar entries, and the like, of separate file systems is substantially synchronized or mirrored. Data synchronization may comprise comparing, deleting, updating, adding, and moving files in the file systems, and the like, as would be readily understood by a worker skilled in the art.

Unified File System Interface

The present technology relates, in part, to a unified file system interface for facilitating interaction with the computing device. The unified file system interface can be configured to function as a file system capable of facilitating interaction with content of the various storage systems of the computing device. The unified file system interface may correspond to functionality of a host computer system to which the computing device is connected. The unified file system interface may be used by various utilities such as synchronization utilities, to facilitate synchronization of data between the host device and the (mobile) computing device.

In some embodiments, the unified file system interface may not necessarily be a fully configured file system. Rather, the unified file system interface may be a computer functionality which is configured to function as a file system, but in fact operates as an intermediary between the storage systems of the computing device and other utilities such as synchronization utilities. The unified file system interface may be configured to translate communications between the utilities and the storage systems, such as commands, queries, responses, and the like.

In various embodiments, the unified file system interface is navigable via directories or folders, sub-directories or sub-folders, files, and the like. Navigating the unified file system interface is performed via predetermined command syntax as would be readily understood by a worker skilled in the art.

In various embodiments, the present technology is configured to provide filename translation, file path translation, or a combination thereof. For example, a lookup table may be maintained which associates the names and path locations of files stored on the first storage system and the second storage system with alias file names and paths associated with the unified file system. When a command or query, for example issued by a synchronization utility, is submitted to the unified file system interface, and that command or query includes a reference to an alias file name, alias file path, or both, then the unified file system interface may be configured to translate the command or query into a command or query directed to an appropriate one of the first or second storage systems. The translation may comprise translating the alias file name, alias file path, or both, into an actual file name, file path, or both, via the lookup table.

In some embodiments, if an association between an alias file and an actual file does not currently exist, another rule set may be invoked to determine a status of the alias file which does not have a corresponding actual file, or a status of the actual file which does not have a corresponding alias file. The determined status may include an ownership of the file, whether the file may be overwritten, or the like, or a combination thereof.

In some embodiments, said other rule set may be configured to determine a course of action in situations where a single alias file is associated with plural actual files. For example, if the following alias file path \\unified\media\photos\pic0001.jpg maps to two existing files: (a) \\[ip-address]\internal\photos\pic001.jpg and (b) \\[ip-address\removable_sdcard\photos\pic001.jpg, then rules may be defined to dynamically generate two unique aliases for each file and record the mapping for the duration of device connection (example: where each file is unique). This corresponds to a rule set which is configured to maintain a separate alias for each actual file, dynamically generating the aliases if required. Alternatively, rules may be defined to allow the existence of a primary file to, in effect, hide the existence of the secondary file. This may be appropriate, for example where the files having a common alias are substantially identical. A file comparison may be performed to determine whether the files are identical and, if so, a common alias may be used, one of the files may be deleted, or the like.

In some embodiments, metadata queried from the device may be used to identify conflicts or exceptions such as identified, for example to identify where two files with the same name and location (within their respective file systems) exist.

In some embodiments, said other rule set may be configured to determine a course of action in situations where a single alias file is registered as being associated with one or more actual files, but the actual files don't exist. For example, the above-mentioned alias file path \\unified\media\photos\pic0001.jpg may point to the same file locations (a) and (b) also identified above, although neither file (a) nor (b) actually exists.

In this case, the rule set may be configured to apply file system operations to the drive (or storage system) where an existing drive reservation has been made. Further, where no drive reservation exists, the rule set may be configured to apply file system operations directly to the primary drive. Further, if using the primary drive fails, certain operations may be applied to the secondary drive (for example, creating a new file).

In some embodiments, said other rule set may be configured to determine a course of action in situations where an alias file is associated with an actual file that exists on a non-primary drive. For example, the above-identified alias \\unified\media\photos\pic0001.jpg may point to a file that exists on the secondary drive, but not on the primary drive. IN this case, for performance efficiencies, the metadata queried from the device may identify the actual file and how the alias is be translated. Where metadata may not be available, the unified file system interface may be configured to detect this condition through dynamic existence checks. A lookup table may be used for caching purposes to improve performance.

In some embodiments, rather than storing and maintaining associations between alias files and actual files, data in the lookup table, unified file system, or both, may be generated based on metadata, for example contained in a database stored on the computing device. Metadata may include file information such as creator, owner, title, file type, tags, filename, file path, file size, and the like. For media files, metadata may include artist, album, song or movie title, or the like. An indexer functionality of the present technology may be configured to acquire this information from the database and use it to generate contents and structure of the unified file system as required, for example dynamically.

In various embodiments, the stored metadata represents a store of information related to actual file locations, which may be translated, as required, into unified file system contents. Information presented via the unified file system interface, which is indicative of structure and contents of the real or virtual unified file system may be generated dynamically or stored in memory.

In various embodiments, the present technology is configured to provide for syntax translation. For example, interaction with a first storage system of the computing device may require a first syntax, while interaction with a second storage system may require a second syntax. Interaction with the unified file system interface may be via a third syntax (possibly equal to the first or second syntax). The unified file system interface may be configured to translate commands or queries provided to it in accordance with the third syntax, for example by a synchronization utility, into the first syntax or second syntax, as appropriate. The unified file system interface may further be configured to translate responses provided to it by the computing device, from the first or second syntax to the third syntax, as appropriate. Expressions cast in one syntax may thus be translated into corresponding expressions cast in another syntax, as necessary in order that interaction with various storage systems may be supported using a common syntax.

Data Management

The present technology relates, in part, to managing storage of content across the first storage system and the second storage system in accordance with a rule set. Content may be managed as it is stored, after it is stored, or a combination thereof.

The rule set may be configured according to various criteria, as described elsewhere herein. For example, the rule set may define preferred amounts of free space to be maintained on each storage system, preferred file types to be allocated to each storage system, and the like. The rule set may allocate data to storage systems such that the integrity of a data file is preserved, that is the data file is not split into separate parts, each part stored on a different storage system. Important files may be backed up on plural storage systems. Error correction facilities, such as those used in RAID systems, may also be used to provide data integrity.

In some embodiments, as content is stored on a storage system or moved between storage systems, a lookup table of the unified file system interface is updated accordingly. For example, a lookup table entry may include, for a given data file, an alias file name and alias file path, as well as an actual file name and actual file path. The alias file name and alias file path are used by external utilities for interaction with the data via the unified file system interface. The actual file name and actual file path are assigned once the data file is stored according to the rule set. If the data file is moved, the actual file name and actual file path stored in the lookup table are updated accordingly. The alias file name and alias file path remain unchanged upon movement of the data file, and are independent of the actual file name and actual file path.

In embodiments where the unified file system interface is configured dynamically on the basis of metadata, the metadata, rather than the lookup table, may be updated as content is stored or moved. Alternatively, if the metadata is distributed with the files, rather than being held in a database or other data structure, updating of metadata may not be performed. Rather, as the files and/or metadata are indexed by an indexer application, the output of the indexer application will be necessarily changed as files are stored or moved.

In some embodiments, client applications may reserve space on a particular storage system, or on a combination of storage systems. Data management will then operate to respect such reservations of space.

In some embodiments, when initiating data transfer, for example related to storing large amounts of data, multiple files, or the like, on a selected storage system, the present technology may be configured to reserve space on the selected storage system before performing the transfer. This may be beneficial if other applications are also writing to the same storage system, so that they do not interfere with the pending transfer.

For example, the following steps may be performed when initiating the transfer of data to a computing device. A check may be performed for existing space reservations related to storage systems associated with the device, for example reservations made by other applications. If reservations exist, then the reserved amount of space is deemed unavailable for storage. Reservations may be related to a particular storage system associated with the device, for example, or else they may be general to the device. A further check may be made to determine whether one or more storage systems have sufficient space available, taking into account existing reservations, to accommodate the data transfer. If sufficient space is available, then the storage may proceed. A further check may be performed for customization in the look-up table. For example, where space is available, a decision could be made to keep music/picture/video albums co-located on the same drive. In some cases, files may be shuffled between drives to achieve the required space allocations. Finally, a decision may be made as to which storage system associated with the device will be the target of the data transfer. For example, the data may be transferred to a designated primary storage system if sufficient space is available, and otherwise the data may be transferred to a designated secondary storage system.

In some embodiments, if a storage system, such as a removable storage medium, is not currently present, synchronization operations related to that storage system may be deferred. The present technology may be configured to recognize that a removable storage medium may be temporarily disconnected, and operate in anticipation that it will be reconnected in future.

In some embodiments, storage of content across the various storage systems is managed at least in part in order to facilitate load balancing. Load balancing may comprise storing selected content in selected storage systems in a manner that improves one or more of access times, synchronization performance, and the like. Load balancing may additionally or alternatively comprise allocating a given amount of data to be stored in each storage system, for example such that each storage system is filled to about the same proportion of its total capacity.

In some embodiments, load balancing may comprise storing files that are likely to be accessed concurrently on different storage systems. In some embodiments, load balancing may comprise, when given different files to be concurrently written to storage, writing the different files to different storage systems. This may increase transfer rates and performance, since overall write bandwidth may be increased. Similarly, when given different files that are likely to be concurrently read from storage, these files may be written to different storage systems so that, subsequently, they may be read in parallel rather than in series, thereby reducing data read times.

In various embodiments, load balancing may be performed when at least some storage systems are not co-located. For example, this may be the case when one of the storage systems is remote or cloud-based. In this case, load balancing may potentially take into account factors such as data access times, bandwidth, latency, and the like, when deciding on a combination of storage systems to use for storing a given set of files. The storage systems may be selected, and appropriate proportions of data allocated to each, in order to realize a desired target data read or data write access time.

In various embodiments, the rule set for managing storage of content is adjusted to facilitate load balancing. Thus, the rule set may comprise rules which are dynamically adjusted, for example in accordance with one or more meta-rules.

Example System

Figure 3:
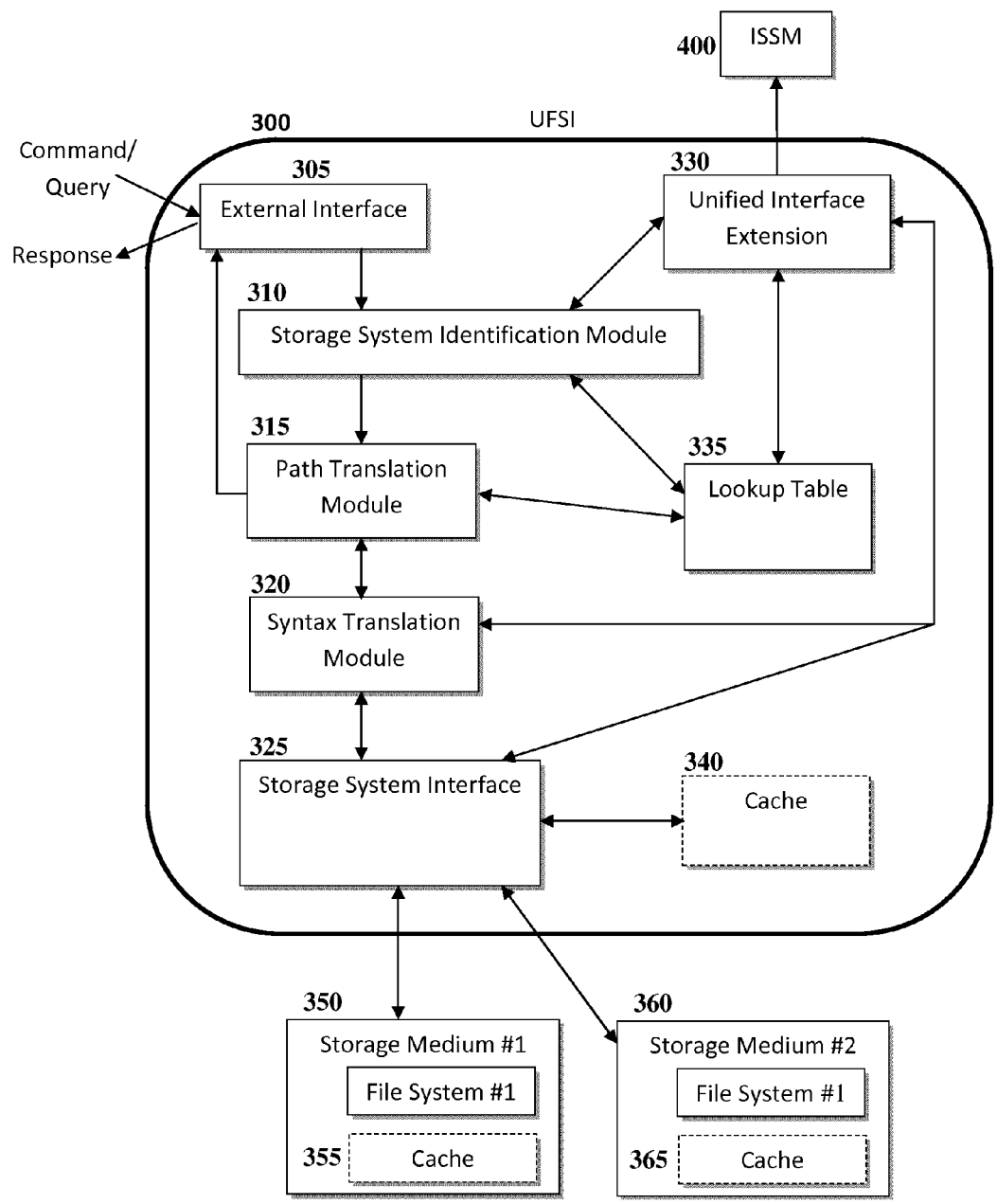
FIG. 3 illustrates a block diagram of a unified file system interface, in accordance with embodiments of the present technology.

FIG. 3 illustrates a block diagram of a unified file system interface (UFSI) 300 provided in accordance with embodiments of the present technology. The UFSI 300 is operatively coupled to a plurality of storage systems 350, 360 via a storage system interface module 325. The UFSI comprises an external interface 305 for interfacing with systems such as synchronization modules. A system interfacing with the UFSI via the external interface 305 may interact with the UFSI as if it were a single file system including the contents of the plurality of storage systems 350, 360. The external interface 305 may thus be responsive to a limited or full set of operations commonly associated with file systems.

The UFSI comprises a storage system identification module 310 which operates as follows. When a command or query is received at the external interface 305 which includes what appears to be an alias file path, that alias file path is passed to the storage system identification module 310. The storage system identification module is configured to determine which of the plurality of storage systems 350, 360 is being used to store the file associated with the alias file path. The determination may be made by consulting a lookup table 335 of the UFSI, which maintains up-to-date associations between alias file paths and the storage system being used to store the actual file associated with the alias file path.

The UFSI further comprises a path translation module 315 which is configured to translate alias file names, alias file paths, or a combination thereof, into actual file names, actual file paths, or a combination thereof. The path translation module may also operate in the reverse direction. Translation operations are enabled by the lookup table 335.

The UFSI further comprises an optional syntax translation module 320. The syntax translation module is configured to translate commands, queries and responses between syntaxes as required.

The UFSI further comprises a storage system interface 325, which operates to communicate various commands and queries to the targeted storage systems, and to receive and forward responses from the various storage systems.

The UFSI may further optionally comprise a cache memory 340, which may be used as temporary storage when transferring data to, from, or between storage media. Additionally or alternatively, each storage system 350, 360 may comprise its own cache memory 355, 365, which may be used for temporary storage when transferring data to or from that associated storage system. Cache memory may be useful, for example, to reduce delays associated with file transfers, for example when one file system is remote or cloud-based.

The UFSI further comprises a unified interface extension 330, which allows direct access to the lookup table 335, syntax translation module 320 and storage system interface 325. The unified interface extension may be used by an inter-storage system management module (ISSM) 400, for example to monitor the locations of various data files, to change the locations of data files as required, and to adjust the lookup table 335 to reflect changes to file locations. Monitoring of data file locations may be performed by querying the lookup table 335.

In some embodiments, when the UFSI receives a command to store data, the storage system identification module 310 may be configured to query the ISSM 400 in order to identify where the data should be stored.

Figure 4:
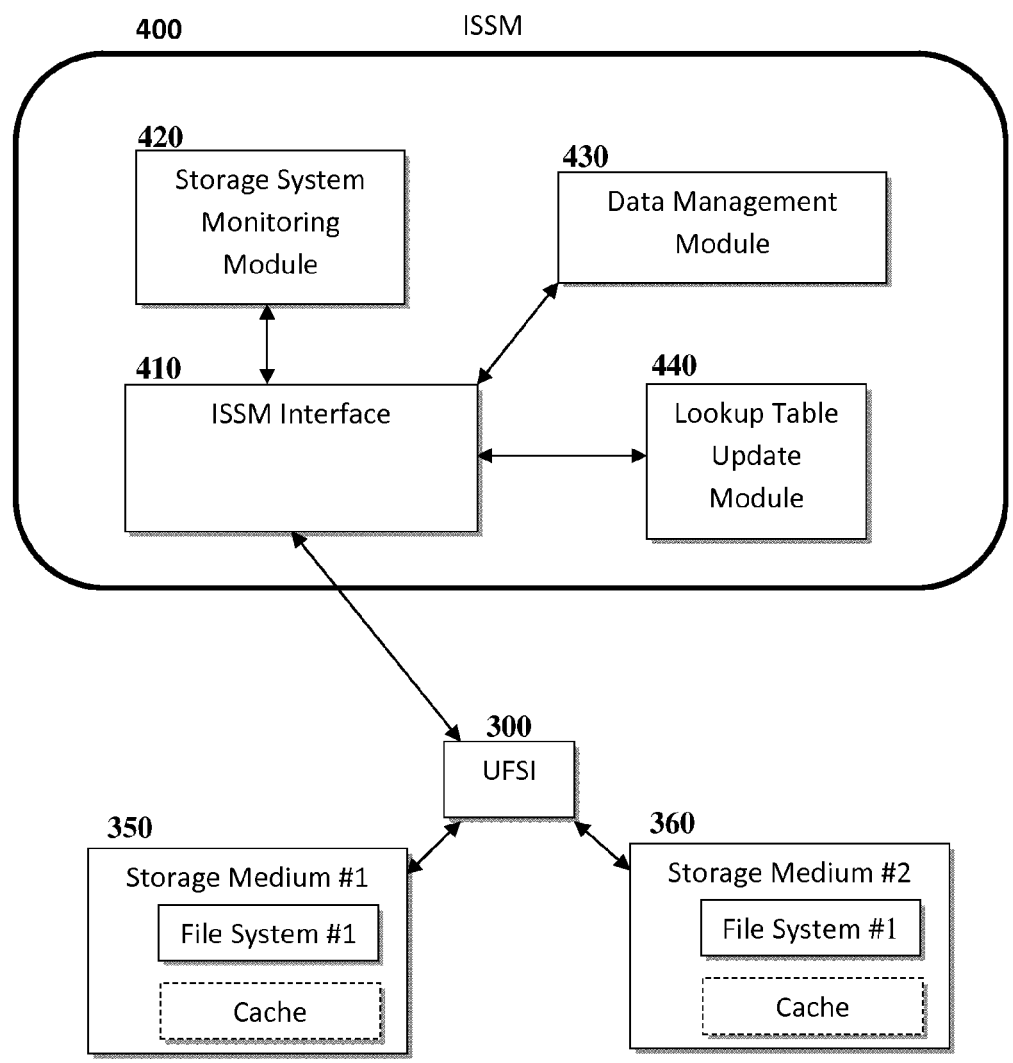
FIG. 4 illustrates a block diagram of an inter-storage system management module, in accordance with embodiments of the present technology.

FIG. 4 illustrates the ISSM 400 in more detail. The ISSM comprises an interface 410, configured to facilitate communication between the various components of the ISSM and at least the unified interface extension 330 of the UFSI. The ISSM may further comprise a storage system monitoring module 420, which is configured to monitor how data is stored on the various storage systems 350, 360. The ISSM further comprises a data management module 430, which is configured to direct where data is stored based on a rule set. The data management module may direct data as it is initially stored. The data management module may further adjust the location of previously stored data. The ISSM further comprises a lookup table update module 440, which is configured to update the path lookup table 335 so that it accurately reflects data file locations, which may have been adjusted by the data management module 430.

In the present example system, the ISSM communicates with the storage systems via the UFSI 300. Alternatively, the ISSM may communicate with the storage systems more directly, that is without such communication being routed through the UFSI.

Additional Details

In some embodiments, clients are required to provide a unique file path identifier for the unified file system. An example file path is \\DTS[DEVICE_PIN]\unified.

In some embodiments, clients are additionally required to provide a file system root path for each file system associated with the computing device.

In some embodiments, each file system may reside on a unique volume, drive, or combination thereof. Different file systems may correspond to different protocols or formats, or all file systems may correspond to the same format. Possible formats include DFPT, Win32, and the like.

In some embodiments, a file system may be an abstraction of one or more other underlying file systems. Abstraction layers may be provided for various reasons, such as simplification, protocol translation, or the like.

In some embodiments, plural root paths may exist within the same volume or drive. In further embodiments, plural root paths may be arranged such that one root path is not the parent of another root path. For example, where multiple music libraries are stored in two distinct file system root paths (for example between Windows™ Media Player™ and iTunes™), a unified file system may be configured to provide a single "files and folders" based view of both libraries.

In various embodiments, one or more storage systems are associated with a priority level. For example, at least one storage system is designated as primary. In addition, other storage systems may be designated as secondary, tertiary, etc. The priority level may determine the order in which storage systems are considered for storing new data during a synchronization event, for example.

Example root paths may include:

```
\DTS[DEVICE_A_PIN]\media;
\DTS[DEVICE_A_PIN]\removable_sdcard;
C:\user\[user]\music;
\\CLOUD[user]\music.
```

Various embodiments of the present technology comprise monitoring of available storage space across all of the storage systems associated with the computing device. Some embodiments may be configured to provide the ability to reserve space on the unified file system for copying new files, overwriting existing files, or a combination thereof. In further embodiments, reservations may be cancelled after they are made.

In some embodiments, when there is not enough storage space on a primary storage system for a given storage operation, then a secondary storage system may automatically be selected and used for the storage operation. This may correspond to automatic failover of storage operations from a primary drive to a secondary drive.

In some embodiments, the unified file system interface provides for one or both of: a combined directly listing across all storage systems; and discovery of files across all storage systems.

In some embodiments, if a file stored on one storage system shares the same relative location as a file on another storage system, the present technology allows for interaction with either file. For example, each file may be associated with a different alias file path in the unified storage system. Alias file paths may be differentiated by assigning a unique file name, appending filenames with a unique extension, placing different alias files in different directories, or the like, or a combination thereof.

In some embodiments, multiple clients, such as synchronization utilities, are capable of concurrently interacting with the present technology, for example via the unified file system interface.

The following is an example of copying a new file to a computing device via a unified file system interface, in accordance with an embodiment of the present technology. A calling client (such as a client associated with a synchronization utility) optionally makes a reservation to ensure that space is available on one or more storage systems of the computing device. Determining whether space is available may make use of drive space monitoring functionality. Space reservations may be made for multiple files at a one time. The calling client subsequently issues a file copy command against the unified file system. A given destination file path is rooted with a unified file system path identifier.

Continuing with the above example, the unified file system interface subsequently copies the file or files. Upon a reservation of space being made, space is allocated on a destination storage system. The destination storage system may be set as a designated primary storage system. Otherwise, if insufficient space is available or other conditions are not satisfied, the destination storage system may be set as another non-primary storage system. If a reservation has been made, a copy file command is issued to the destination storage system. Upon success of the copy operation, the reservation is released. If a reservation has not been made, a check is made to ensure that adequate storage space is available on the primary storage system. If adequate space is available, a copy file command is issued to the primary storage system. If space is not available, a copy file command is issued to another non-primary storage system.

Figure 5:
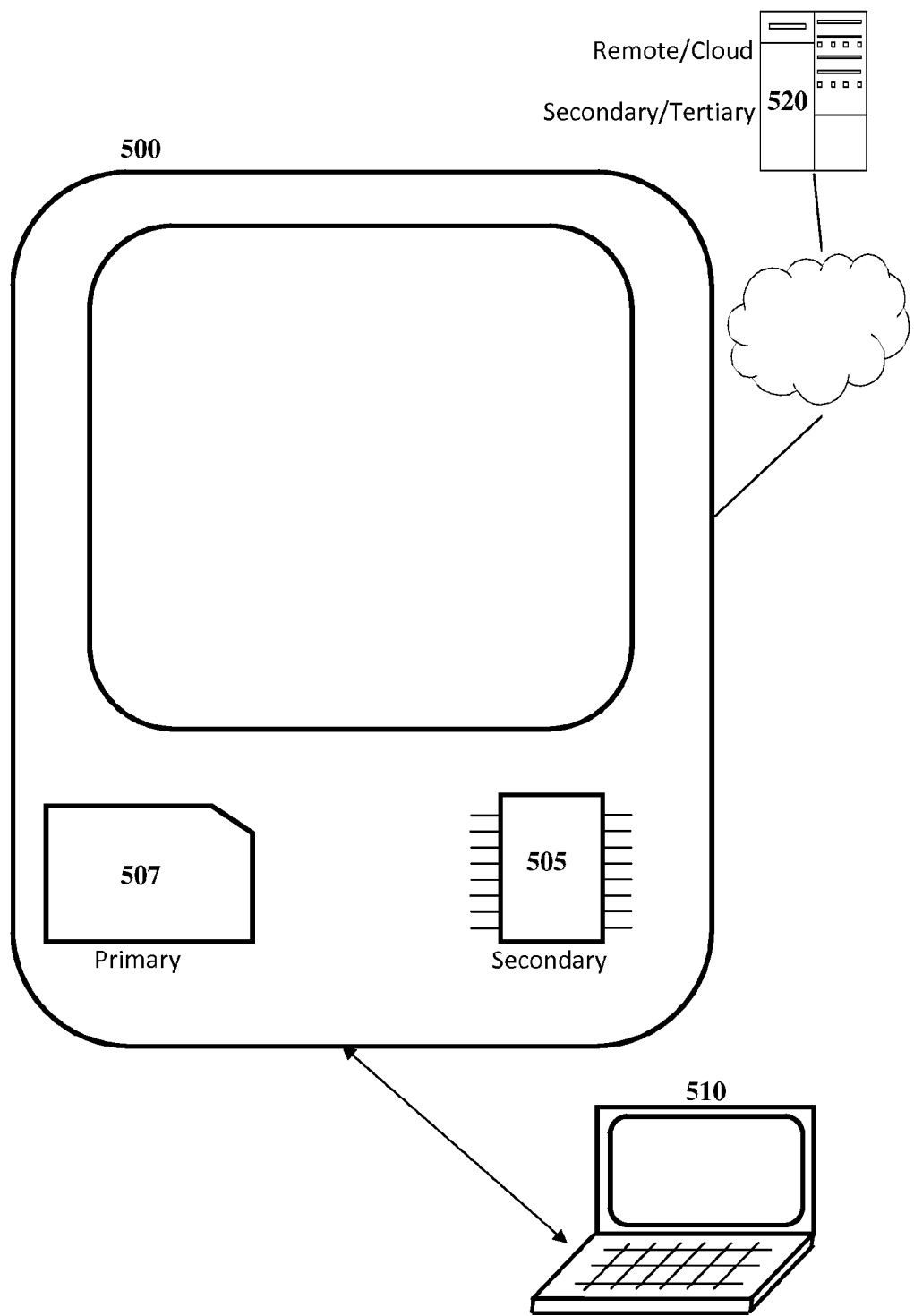
FIG. 5 illustrates a computing device associated with plural storage systems, in accordance with embodiments of the present technology.

FIG. 5 illustrates, in accordance with embodiments of the present technology, a computing device 500, in the form of a mobile device, operatively coupled to a host computer system 510, for example via a wired or wireless connection, and optionally to a remote or cloud storage system 520 via a wireless network. The computing device is associated with the remote or cloud storage system 520, as well as an internal storage system 505, such as a flash memory, and with a removable storage system 507, such as an SD™ card.

The host computer system 510 is configured to provide a unified file system interface for accessing contents of the remote or cloud storage system 520, the internal storage system 505, and the removable storage system 507. Data synchronization between the host computer system 510 and the computing device 500 may be performed via the unified file system interface.

In some embodiments, one or more of the remote or cloud storage system 520, the internal storage system 505, and the removable storage system 507, are associated with a priority level. For example, the removable storage system 507 may be designated as primary, the internal storage system 505 may be designated as secondary, and the remote or cloud storage system 520 may be designated as tertiary. Files may be preferentially stored to higher priority storage systems, for example during a synchronization or data management event.

Figure 6:
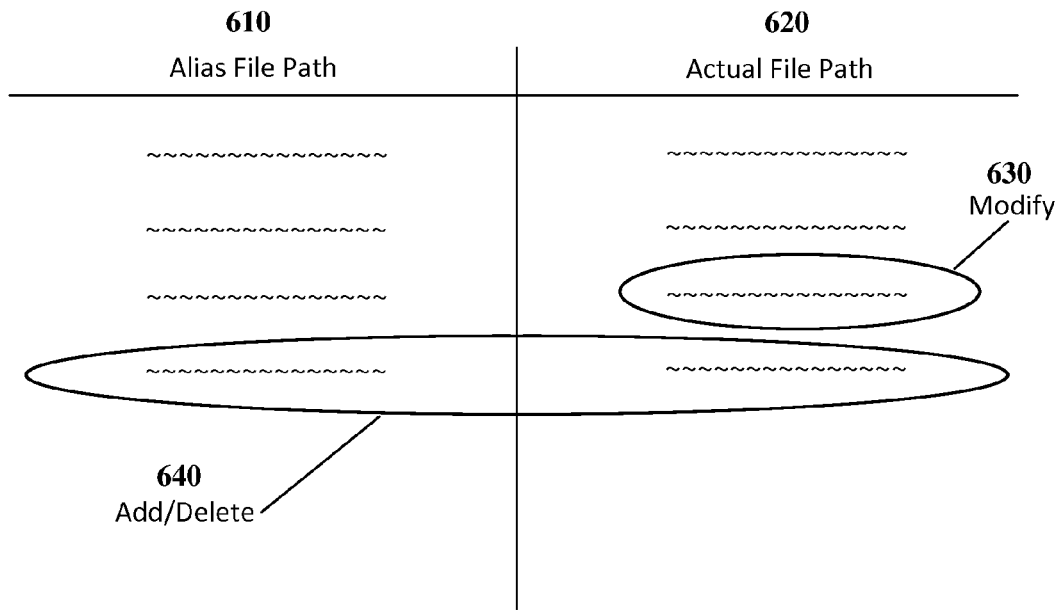
FIG. 6 illustrates correspondences between alias file paths and actual file paths, in accordance with embodiments of the present technology.

FIG. 6 illustrates a set of correspondences between alias file paths 610 and actual file paths 620, in accordance with embodiments of the present technology. The correspondences may be encoded in the form of a database or lookup table stored in computer memory, for example. Alternatively, the various correspondences may be generated dynamically as required. The alias file paths 610 designate how a particular file may be accessed via the unified file system interface. The actual file paths 620 designate the actual storage system, and location within that storage system, where each particular file is actually stored (or virtually stored in the case of a virtual storage system). In various embodiments, when a file having a particular alias is accessed or queried via the unified file system interface, the unified file system interface translates the alias file path into the corresponding actual file path, and issues an appropriate command for processing by the storage system designated within the actual file path.

FIG. 6 further illustrates the modification 630 of a particular actual file path, for example due to the corresponding file being moved. Notably, although this actual file path is modified, the corresponding alias file path remains unmodified and independent of the actual file path. In contrast, when a file is added or deleted 640, both an alias file path and an actual file path corresponding to that file are added or deleted.

Figure 7:
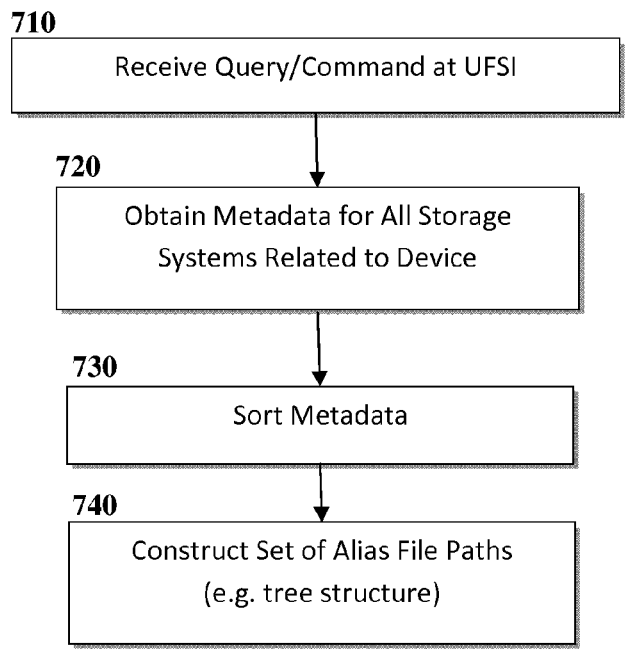
FIG. 7 illustrates a set of operations for generating a set of alias file paths from metadata, in accordance with embodiments of the present technology.

FIG. 7 illustrates a set of operations for generating a set of alias file paths from metadata, in accordance with embodiments of the present technology. Upon receipt 710 of a query or command at the unified file system interface, metadata is obtained 720 for all storage systems related to a computing device. The metadata may be stored in a central database, a collection of databases, for example one on each storage system, or distributed throughout the storage systems, for example distributed with files in the corresponding file systems. The metadata may be sorted 730 if it is not already sorted. For example, the metadata may be sorted by file size, file type, file name, artist, album, or the like. A set of alias file paths, for example arranged in accordance with a tree-like directory structure, is then constructed 740 from the metadata. In some embodiments, the set of alias file paths represents only a portion of all available files. The portion may be constructed based on contents of the original query. For example, if the query relates to music files only, the set of alias file paths may reflect only stored music files. The unified file system interface is configured to exhibit the constructed set of file paths on demand.

Figure 8:
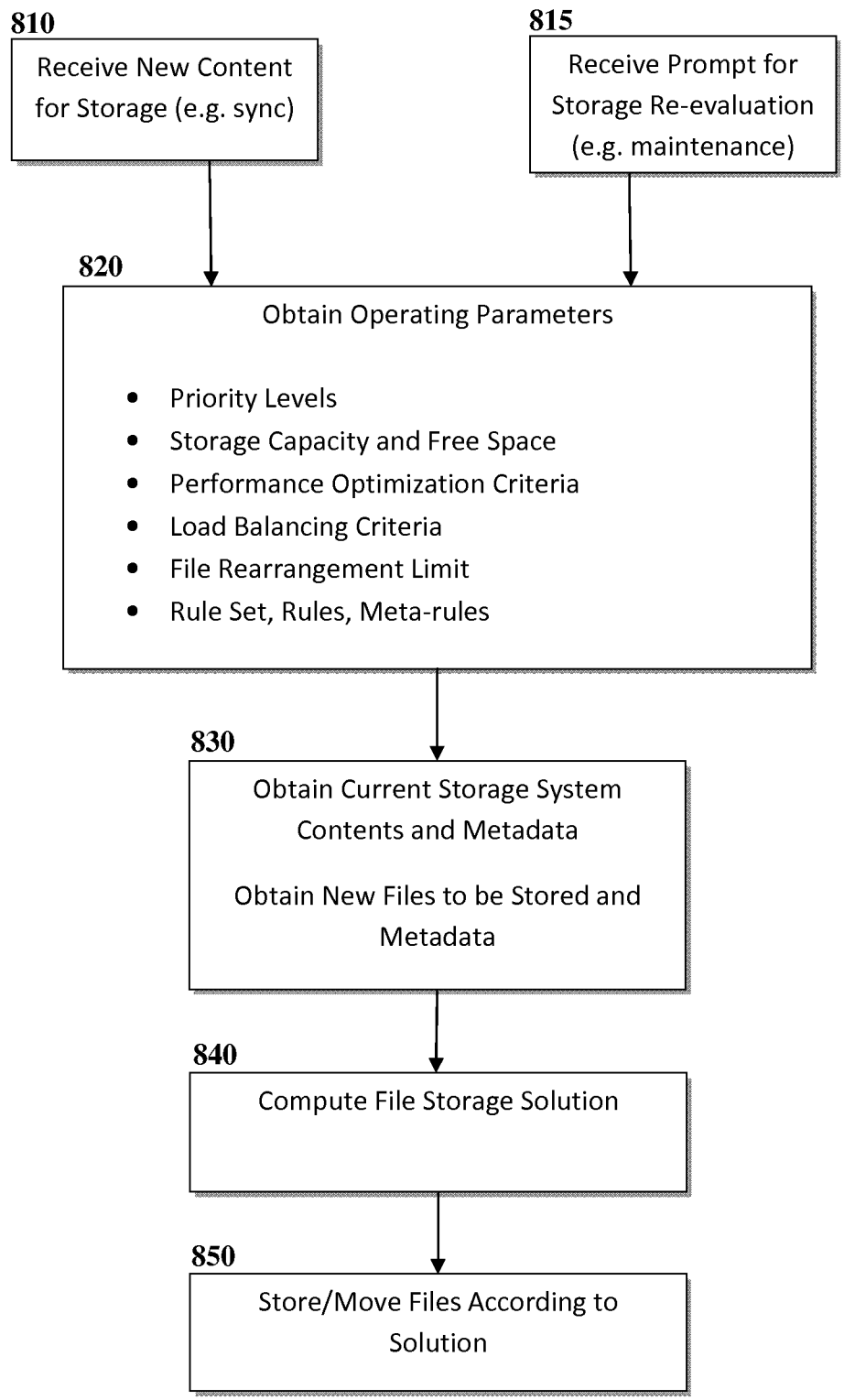
FIG. 8 illustrates a set of operations for managing storage of content across a plurality of storage systems, in accordance with embodiments of the present technology.

FIG. 8 illustrates a set of operations for managing storage of content across a plurality of storage systems, in accordance with embodiments of the present technology. The set of operations may be executed, in part, by an inter-storage system management module. The set of operations may initiated by receipt 810 of new content to be stored by the computing device, for example in accordance with a synchronization operation. Optionally, the set of operations may initiated by receipt 815 of a command to re-evaluate and maintain storage on the computing device. Such maintenance commands may be received periodically as part of a maintenance routine, user-generated, generated in response to one or more events such as storage levels or other performance metrics approaching a predetermined limiting value, or the like.

The set of operations comprises obtaining 820 a set of operating parameters from memory, for example memory associated with the computing device, a host computer system, or a combination thereof. The operating parameters may designate priority levels of one or more storage systems associated with the computing device. The operating parameters may further include storage system memory capacity, current used and free space, and the like. The operating parameters may further comprise performance optimization criteria to be used, load balancing criteria, and the like.

In some embodiments, the operating parameters may further comprise a file rearrangement limit, which limits the degree to which existing files on the storage systems may be rearranged in computation of the present storage solution. For example, when a new file is being added, the limit may specify that no other files are to be moved, one, two or more files may be moved as necessary. The file rearrangement limit may also specify circumstances under which files may be moved. The file rearrangement limit may be specified in various terms, such as number of files that can be moved, amount of data that can be moved, time that can be used for moving data, number of logical operations and memory access operations that can be used, or the like, or a combination thereof.

The set of operating parameters may comprise a rule set, which, for the purposes of this embodiment and others, may comprise both rules and meta-rules as described elsewhere herein. The rule set may designate how files are to be stored, for example how files of different sizes and types are to be treated, potentially based on other operating parameters.

The set of operations further comprises obtaining 830 information indicative of the current contents of the various storage systems of the computing device, along with information indicative of new files to be stored, if applicable. The information may include file metadata retrieved from the storage systems or a database. At least some of the information may be retrieved via the unified file system interface.

The set of operations further comprises computing 840 a file storage solution based on the obtained operating parameters and current contents of the storage systems and new files to be stored. The file storage solution may be computed in order to satisfy or approach satisfaction of various criteria, such as criteria specified in the rule set, performance optimization and load balancing criteria, file rearrangement limits, and the like. The file storage solution may or may not be an optimal solution. A limit may be placed on the time or effort taken in computation of the file storage solution. Various approaches may be used to compute a candidate file storage solution, such as multidimensional optimization, linear programming, neural networks, machine learning, simulated annealing, and the like.

The set of operations further comprises storing 850 and possibly moving files on the various storage systems in accordance with the computed file storage solution. Commands for executing storage and movement of files may be issued to the computing device via a unified interface extension.

Dynamic Path Adjustment

In some embodiments, the path to a particular storage system may be adjusted dynamically and possibly during a synchronization or other communication operation. For example, a mobile device may initially be connected to a host via a first interface such as an RNDIS interface associated with a first IP address. The RNDIS interface may operate over USB™, for example. The connection may then be switched, for example by the host or mobile device, to a VPN tunnel interface associated with a second IP address. The VPN tunnel interface may operate over USB™ or Wi-Fi™, or a combination thereof, for example. The physical interface and path may or may not be changed by the switch, but logical characteristics of the interface and path, such as the IP address, are changed. As another example, a mobile device may initially be connected to a host via a first interface such as a USB™ interface. The mobile device may then be disconnected from the first interface. Such a disconnection may initiate connection to another interface, or failover use of another existing interface, such as a Wi-Fi™ interface. The host may thus be connected to the same storage system of the mobile device via different paths.

In some embodiments, each path to a storage system, and thus each associated communication interface, may associated with a separate IP address, and each path may be associated a separate set of communication protocols. For example, one path may be associated with an RNDIS interface while another may be associated with a VPN tunnel. The RNDIS interface may facilitate communication over a USB™ interface, for example. The VPN tunnel may operate over both the USB™ interface and a Wi-Fi™ interface, wherein switching between these two physical interfaces does not require a corresponding change in IP address. In some embodiments, the apparatus is configured to check for availability of the VPN tunnel upon connectivity changes, such as a USB™ connection or disconnection operation.

In some embodiments, each path to a storage system may comprise a separate physical interface at the host device, a separate physical interface at the mobile device, and a separate transmission medium. For example, a USB™ path may comprise USB™ communication electronics, connection ports, and a cable. A Wi-Fi™ path may comprise a pair of radio transceivers in communication with each other.

Embodiments of the present technology, for example methods and apparatuses, may be configured to facilitate communication with the same storage system via different physical paths, logical paths, or combinations thereof. Furthermore, the unified file system interface may be configured to provide a common set of file path aliases which may be used to access corresponding content of the storage system, regardless of which of the different paths is being used.

In some embodiments, the mobile device may comprise a single storage system, rather than plural storage systems. However, as the mobile device comprises multiple communication interfaces, a combination of a first interface (physical, logical or both) with a given storage system may be regarded, in some such cases, as corresponding to a first logical storage system, while a combination of a second interface (physical, logical or both) with the same given storage system may be regarded as corresponding to a second logical storage system. Regarding different logical storage systems as different storage systems may help to contextualize the present embodiments of the technology within the technology as a whole. For a given logical storage system, the underlying communication interface is configured to communicate with the underlying storage system and provide external access thereto.

In some embodiments, the mobile device may comprise multiple storage systems, at least two of which is associated with two or more different interfaces and hence two or more logical storage systems.

Figure 9:
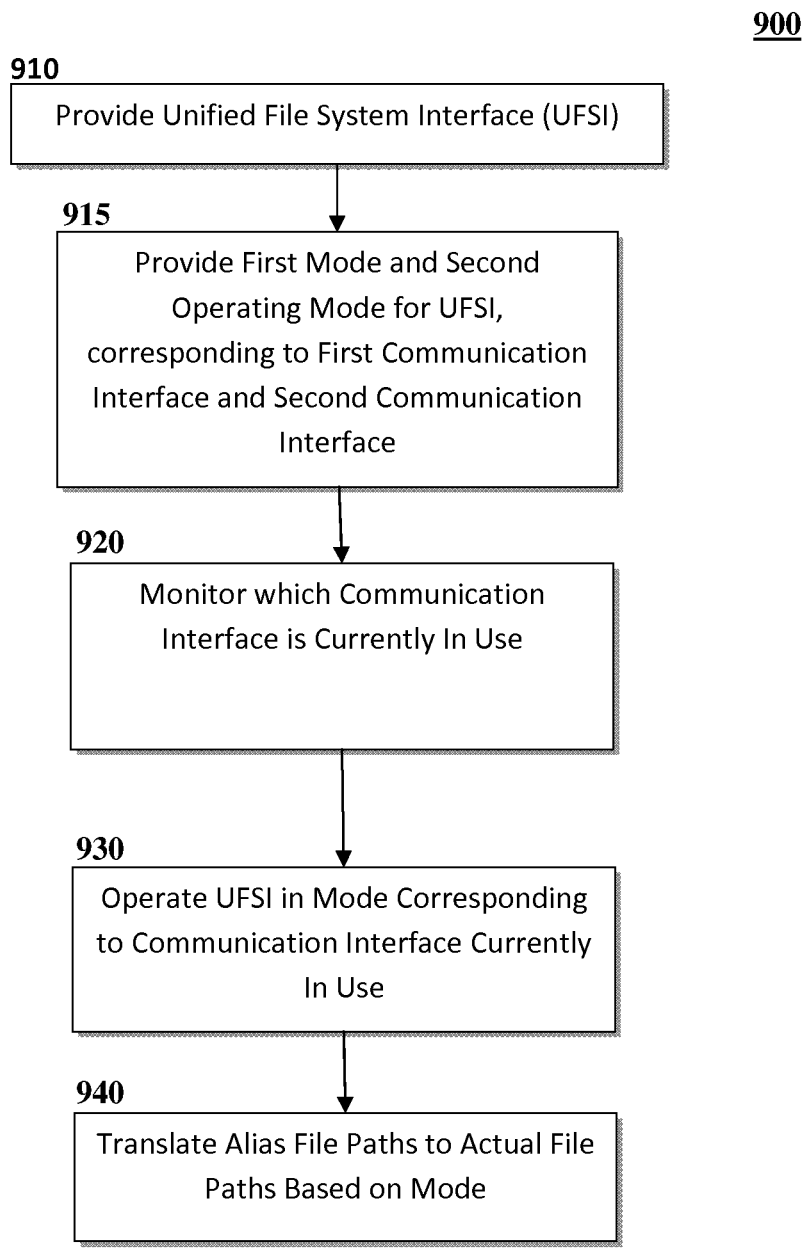
FIG. 9 illustrates a method for managing data storage and access on a computing device, in accordance with embodiments of the present technology.

With reference to FIG. 9, an aspect of the present technology comprises a method 900 for managing data storage and access on a computing device. The computing device is associated with at least a first storage system. The computing device may optionally be associated with a second storage system. The computing device comprises at least a first communication interface and a second communication interface. The combination of the first communication interface and the first storage system may be referred to as a first logical storage system, while the combination of the second communication interface and the first storage system may be referred to as a second logical storage system. It is noted that the different logical storage systems may contain the same physical information content, although this is not strictly necessary.

The method comprises providing 910 a unified file system interface for facilitating interaction with the computing device. The unified file system interface is configured to facilitate interaction with content of the first storage system via both the first communication interface and the second communication interface, subject to connection availability for those interfaces. In other words, the unified file system interface facilitates interaction with the first logical storage system and the second logical storage system. The unified file system interface is configured for such operation via a provided 915 first mode and second mode.

The unified file system interface may be provided within a host computer. Access to storage system content via the first communication interface may be associated with a first communication path of the host computer, such as a first file system path. Access to storage system content via the second communication interface may be associated with a second communication path of the host computer, such as a second file system path. As an example, for an RNDIS communication interface, a certain piece of content may be accessible via the path \\[ip-address-RNDIS]\internal\photos\pic001.jpg.

For a VPN tunnel communication interface, the same piece of content may be accessible via the path \\[ip-address-VPN]\internal\photos\pic001.jpg, where [ip-address-RNDIS] and [ip-address-VPN] are different IP addresses or IP address handles.

As another example, for a network-based communication interface such as a Wi-Fi™ or Ethernet interface, a certain piece of content may be accessible via the path \\[ip-address]\internal\photos\pic001.jpg.

For a USB™ or other removable mass-storage interface, the same piece of content may be accessible via the path E:\internal\photos\pic001.jpg.

In some embodiments, the present technology is configured to dynamically change the communication path being used, for example between different IP address based paths, or from an IP address based path to a mounted drive letter based path, for example during a synchronization operation. For example, if the mobile device is disconnected from a USB IP-address via RNDIS path but is still or subsequently connected to a VPN tunnel IP address over Wi-Fi™ path, the new path may be used in place of the old path to continue the synchronization operation, possibly without noticeable interruption. The unified file system interface begins using the new path over the old path automatically. The same alias file path may be used to access content via the unified file system interface, both before and after the automatic path switch.

The method further comprises monitoring 920 which of the first communication interface and the second interface is currently in use. Such monitoring may comprise monitoring activity of corresponding physical or logical interfaces of the host computer system, for example, or by monitoring the status of operating parameters such as IP addresses or software modules used by the host computer system.

The method further comprises operating 930 the unified file system interface in the first mode when the first communication interface is in use and operating the unified file system interface in the second mode when the second communication interface is in use. This may comprise, for example, translating 940 alias file paths to actual file paths based on the current mode.

Further in accordance with the method 900, the unified file system interface is configured to provide access to content of the storage system via alias file paths which are independent of whether the unified file system interface is operating in the first mode or the second mode.

The unified file system interface is configured such that file paths within the unified file system interface are independent of which of the first communication interface and the second communication interface is used for accessing corresponding content of the first storage system. In other words, the file paths within the unified file system interface are independent of which of the first logical storage system and the second storage system is being used for accessing the corresponding content. Thus, an external utility such as a synchronization utility can interface with storage system content, via the unified file system interface, using an alias file path which maps to an appropriate actual file path.

In accordance with another aspect of the present technology, when one or more connections with a first storage system of the mobile device are lost, for example during a synchronization or other data operation, or around the time of a planned synchronization operation, the unified file system interface may provide a failover connection to another storage system to which a connection is available. This may be a remote or cloud-based storage system associated with the mobile device, for example, or a storage system within the mobile device which is only accessible via some communication interfaces but not others. Synchronization may then proceed or continue between the host computer and the remote or cloud-based storage system (or other internal storage system). Subsequently, the mobile device may access the synchronized content by connecting to the remote or cloud-based storage system (or by accessing the other storage system).

Figure 10:
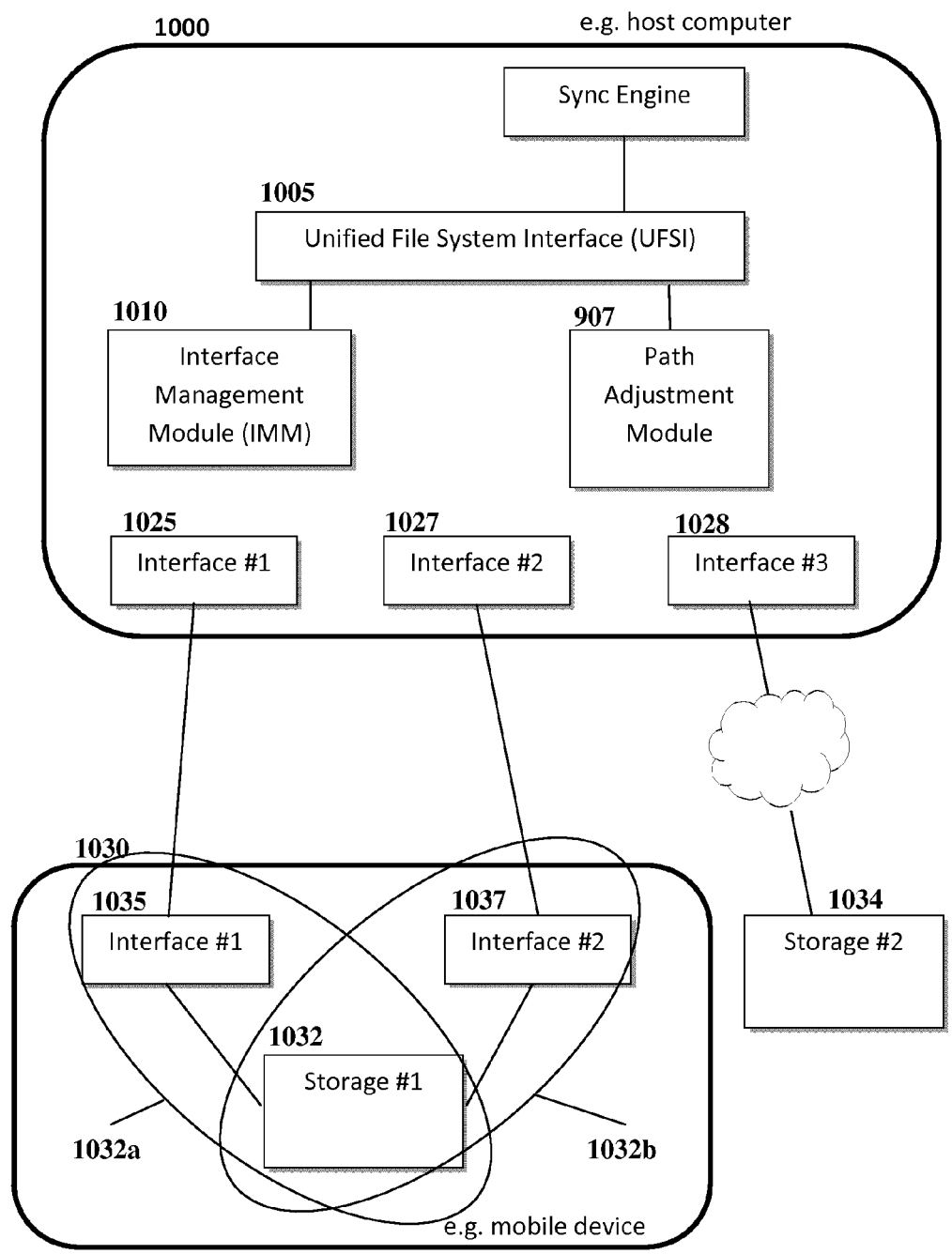
FIG. 10 illustrates an apparatus for managing data storage and access on a computing device, in accordance with embodiments of the present technology.

FIG. 10 illustrates an apparatus 1000 for managing data storage and access on a computing device 1030, in accordance with embodiments of the present technology. The computing device 1030 comprises at least a first storage system

1032. The computing device 1030 comprises a first communication interface 1035 and a second communication interface 1037. The apparatus comprises corresponding first and second host communication interfaces 1025 and 1027 for communicating with the first and second communication interfaces 1035 and 1037, respectively. The computing device may further be associated with a second, remote or cloud-based storage system 1034, and the apparatus may comprise a host communication interface 1028 configured for communication with the remote or cloud-based storage system 1034.

The apparatus 1000 comprises a unified file system interface 1005 configured to facilitate interaction with the computing device. The unified file system interface is configured to function, from the perspective of an external client utility, as a file system capable of facilitating interaction with content of the first storage system 1032 via the first communication interface and the second communication interface. That is, the unified file system is capable of facilitating interaction with content of the first logical storage system 1032a and the second logical storage system 1032b. The unified file system is further configured as a file system capable of facilitating interaction with content of the second storage system 1034, if available.

The apparatus 1000 further comprises an interface management module 1010 configured to monitor connectivity of the apparatus with the first and second communication interfaces 1025 and 1027 of the computing device, as well as connectivity with the remote or cloud-based storage system 1034 via the associated communication interface 1028, and to select from currently available communication interfaces, storage systems. Communication with the mobile device then proceeds via the selected interface, storage system, or both. In addition, the actual file paths associated with alias file paths are adjusted based on which interface, storage system, or both, is currently being used. A path adjustment module 1007 is used to adjust the actual file paths associated with alias file paths based on the currently used interface, storage system, or both. The path adjustment module 1007 may be configured to adjust a path prefix, such as an IP address, or it may be configured to select a particular column of a lookup table for use.

FIG. 11 illustrates correspondences between alias file paths and actual file paths, in accordance with embodiments of the present technology. The alias file paths and actual file paths may be full file paths, or partial file paths. A lookup table comprises a list of one or more alias file paths 1110, each of which is associated with a list of actual file paths 1120 for use with a first interface, logical storage system, or both and a list of actual file paths 1130 for use with a second interface, logical storage system, or both. Additional columns may be added to the lookup table if more interfaces are potentially available. An appropriate one of the actual file path columns of the lookup table may be selected for use, depending on which of the interfaces, logical storage systems, or both, are being used to access data (for example stored on a common physical storage system). For example, if the first interface is currently available, the list of actual file paths 1120 may be used. In this case, each alias file path of the list 1110 is translated, as needed, into a horizontally adjacent entry in the list of actual file paths 1120.

In one embodiment, the lists of actual file paths 1120 and 1130 each contain one entry, which is an IP address to be used as part of an actual file path. The remainder of the actual file path is understood to match a given portion of the alias file path. Thus, for example, the lookup table can be used to replace a path such as
 \\DTS[PIN]\unified\album\artist\track.mp3
may be written to an actual file path corresponding to a removable SD™ card:
 \\[IP-address]\internal\music\album\artist\track.mp3,
where [IP-address] is replaced with an IP address from the appropriate (single-entry) list 1120 or 1130.

The method and apparatus optionally comprises managing storage of content across different physical storage systems in accordance with a rule set, as described elsewhere herein.

Mount Point

In some embodiments, one or more physical storage systems, logical storage systems, paths to storage systems, or the like, may be associated with a mount point. The mount point may be regarded as a file system object and may correspond with a "drive letter" used by operating systems such as Windows™.

For example, a storage system associated with a removable SD card, which may be accessed via the path:
 \\[ip-address]\removable_sdcard\music
may also be mounted on X:\ or X:\music and accessible via that drive letter.

Continuing with the above example, a storage system may additionally or alternatively be associated with internal memory of a computing device, which may be accessed via the path:
 \\[ip-address]\media\music
may also be mounted on Y:\ or Y:\music and accessible via that drive letter.

In one embodiment, the unified file system interface comprises mount points or drive letters which map to storage system paths, such as IP-address based paths as in the above examples. Access to a file or directory via drive letters associated with the unified file system interface may result in access, via the unified file system interface, to a corresponding file or directory of the corresponding storage system. In some embodiments the unified file system interface may dynamically select the appropriate physical or logical storage system to access based on the designated mount point or drive letter. In some embodiments, there may be a one-to-one correspondence between mount points and physical or logical storage systems.

In some embodiments, a mount point may be dynamically assigned, and may change after a disconnection or reconnection, for example a disconnection from a USB™ cable or Wi-Fi™ connection.

In some embodiments, a mount point may change when the mode of access to a physical storage system is adjusted, for example from an RNDIS interface to a VPN tunnel interface. Such a mount point change may be handled similarly to an IP address change.

In some embodiments, using a mount point such as a drive letter may result in some performance gain relative to using an IP address directly for access to a storage system by an operating system such as Windows™. This benefit may derive in part from avoiding the operating system from performing a lookup of the IP address prior to executing a file system operation.

Computer Program Product

Acts associated with the method described herein can be implemented as coded instructions in a computer program product. In other words, the computer program product is a computer-readable medium upon which software code is recorded to execute the method when the computer program product is loaded into memory and executed on the microprocessor of the mobile device.

Apparatus

Embodiments of the present technology relate to an apparatus for managing data storage, data access, and data synchronization. The apparatus may be a special-purpose or general-purpose computer such as a desktop or laptop personal computer, configured via software, firmware, or both. As would be readily understood by a worker skilled in the art, such a computer generally comprises components such as a user interface, processor, volatile memory, non-volatile memory, wired device interface ports, wireless device interface ports, wired network interface ports, wireless network interface ports, power supply, and the like.

The computing device which comprises a plurality of storage systems may be a mobile device to which the apparatus is operatively coupled, for example for communication purposes. The computing device may be a PDA, smartphone, tablet computer, or the like. The computing device may comprise various storage media, such as removable or non-removable solid-state storage media.

One or more processors of the apparatus are generally configured to execute program instructions related to the present technology, the program instructions stored in memory. The apparatus may comprise one or more modules, which may, in some embodiments, be interpreted as functional modules enabled by different sets of program instructions stored in common memory and executed by a common set of processors.

This new technology has been described in terms of specific implementations and configurations (and variants thereof) which are intended to be exemplary only. The scope of the exclusive right sought by the applicant is therefore intended to be limited solely by the appended claims.

We claim:

1. A method for managing data storage and access on a computing device, the computing device associated with a storage system accessible via a first communication interface and a second communication interface, the method comprising:
    a) providing a unified file system interface for facilitating interaction with the computing device, the unified file system interface operable in a first mode and a second mode, wherein the unified file system provides alias file paths associated with a file system, the alias file paths for use in accessing content of the storage system, wherein in the first mode the unified file system interface maps the alias file paths to a first set of actual file paths usable for interaction with said content of the storage system via the first communication interface, and wherein in the second mode the unified file system interface maps the alias file paths to a second set of actual file paths usable for interaction with said content of the storage system via the second communication interface;
    b) monitoring which of the first communication interface and the second communication interface is currently in use; and
    c) operating the unified file system interface in the first mode when the first communication interface is in use and operating the unified file system interface in the second mode when the second communication interface is in use
wherein the alias file paths are independent of whether the unified file system interface is operating in the first mode or the second mode.

2. The method according to claim 1, wherein the unified file system interface comprises alias files accessible via an alias file path structure, the method further comprising providing associations between each of the alias files and corresponding content of the storage system accessed via the first communication interface and providing associations between each of the alias files and corresponding content of the storage system accessed via the second communication interface.

3. The method according to claim 2, wherein the associations are provided based at least in part on contents of a lookup table stored in memory.

4. The method according to claim 1, wherein interaction with the unified file system interface is performed via a first syntax, and interaction with the storage system is performed via a second syntax, different from the first syntax, the method further comprising translating between the first syntax and the second syntax.

5. The method according to claim 1, further comprising performing data synchronization operations via the unified file system interface.

6. The method according to claim 1, wherein the unified file system interface is associated with one or more mount points or drive letters, wherein interaction with the unified file system interface via said one or more mount points or drive letters corresponds to interaction with corresponding content of the storage system of the computing device.

7. An apparatus for managing data storage and access on a computing device, the computing device associated with a storage system accessible via a first communication interface and a second communication interface, the apparatus comprising computer components including a microprocessor operatively coupled to memory, said computer components configured to implement functional modules including:
    a) a unified file system interface for facilitating interaction with the computing device, the unified file system interface operable in a first mode and a second mode, wherein the unified file system provides alias file paths associated with a file system, the alias file paths for use in accessing content of the storage system, wherein in the first mode the unified file system interface maps the alias file paths to a first set of actual file paths usable for interaction with said content of the storage system via the first communication interface, and wherein in the second mode the unified file system interface maps the alias file paths to a second set of actual file paths usable for interaction with said content of the storage system via the second communication interface;
    b) an interface management module configured to monitor which of the first communication interface and the second interface is currently in use; and
    c) a path adjustment module configured to cause the unified file system interface to operate in the first mode when the first communication interface is in use and operating the unified file system interface in the second mode when the second communication interface is in use;
wherein the alias file paths are independent of whether the unified file system interface is operating in the first mode or the second mode.

8. The apparatus according to claim 7, wherein the unified file system interface comprises alias files accessible via an alias file path structure, the method further comprising providing associations between each of the alias files and corresponding content of the storage system accessed via the first communication interface and providing associations between each of the alias files and corresponding content of the storage system accessed via the second communication interface.

9. The apparatus according to claim 8, wherein the associations are provided based at least in part on contents of a lookup table stored in memory.

10. The apparatus according to claim 7, wherein interaction with the unified file system interface is performed via a first syntax, and interaction with the storage system is performed via a second syntax, different from the first syntax, the method further comprising translating between the first syntax and the second syntax.

11. The apparatus according to claim 7, further comprising performing data synchronization operations via the unified file system interface.

12. The apparatus according to claim 7, wherein the unified file system interface is associated with one or more mount points or drive letters, wherein interaction with the unified file system interface via said one or more mount points or drive letters corresponds to interaction with corresponding content of the storage system of the computing device.

13. A computer program product for managing data storage and access on a computing device, the computing device associated with a storage system accessible via a first communication interface and a second communication interface, the computer program product comprising a non-transitory computer readable medium having code embedded therein which, when loaded into memory and executed on a processor of a computer, is adapted to perform the following:
   a) provide a unified file system interface for facilitating interaction with the computing device, the unified file system interface operable in a first mode and a second mode, wherein the unified file system provides alias file paths associated with a file system, the alias file paths for use in accessing content of the storage system, wherein in the first mode the unified file system interface maps the alias file paths to a first set of actual file paths usable for interaction with said content of the storage system via the first communication interface, and wherein in the second mode the unified file system interface maps the alias file paths to a second set of actual file paths usable for interaction with said content of the storage system via the second communication interface
   b) monitor which of the first communication interface and the second interface is currently in use; and
   c) operate the unified file system interface in the first mode when the first communication interface is in use and operating the unified file system interface in the second mode when the second communication interface is in use;
wherein alias file paths are independent of whether the unified file system interface is operating in the first mode or the second mode.

14. The computer program product according to claim 13, wherein the unified file system interface comprises alias files accessible via an alias file path structure, the method further comprising providing associations between each of the alias files and corresponding content of the storage system accessed via the first communication interface and providing associations between each of the alias files and corresponding content of the storage system accessed via the second communication interface.

15. The computer program product according to claim 13, wherein the associations are provided based at least in part on contents of a lookup table stored in memory.

16. The computer program product according to claim 13, wherein interaction with the unified file system interface is performed via a first syntax, and interaction with the storage system is performed via a second syntax, different from the first syntax, the method further comprising translating between the first syntax and the second syntax.

17. The computer program product according to claim 13, further comprising performing data synchronization operations via the unified file system interface.

18. The computer program product according to claim 13, wherein the unified file system interface is associated with one or more mount points or drive letters, wherein interaction with the unified file system interface via said one or more mount points or drive letters corresponds to interaction with corresponding content of the storage system of the computing device.

* * * * *